(No Model.)

W. R. PATTERSON.
JOINT FOR ELECTRIC CABLES.

No. 321,240. Patented June 30, 1885.

Witnesses.
Saml B. Dover.
F. H. McCulloch.

Inventor.
William R. Patterson
By Geo. P. Barton.
Attorney.

United States Patent Office.

WILLIAM R. PATTERSON, OF CHICAGO, ILLINOIS, ASSIGNOR TO THE WESTERN ELECTRIC COMPANY, OF SAME PLACE.

JOINT FOR ELECTRIC CABLES.

SPECIFICATION forming part of Letters Patent No. 321,240, dated June 30, 1885.

Application filed May 12, 1885. (No model.)

*To all whom it may concern:*

Be it known that I, WILLIAM R. PATTERSON, a citizen of the United States, residing at Chicago, in the county of Cook and State of Illinois, have invented a certain new and useful Improvement in Joints for Lead Pipes of Armored Cables, (Case 47,) of which the following is a full, clear, concise, and exact description, reference being had to the accompanying drawings, forming a part of this specification.

My invention relates to joints for telegraph-cables; and it consists in providing an extra armor about the joint of an armored telegraph-cable and soldering the same thereto, so as to make the joint rigid.

Figure 1:
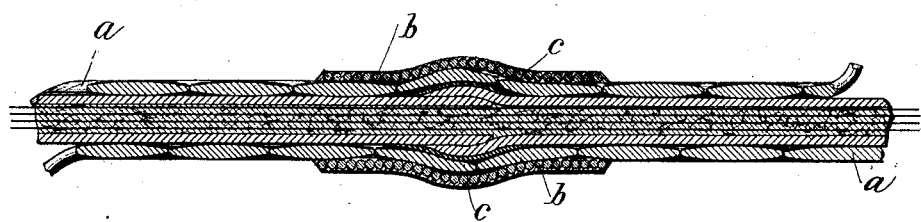
Figure 2:
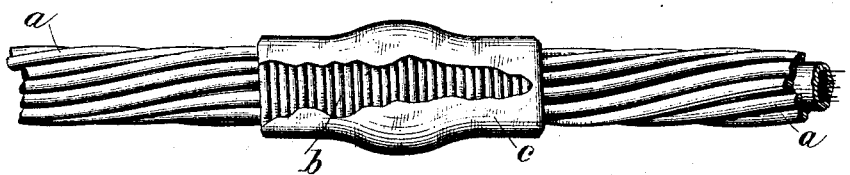
Figure 3:
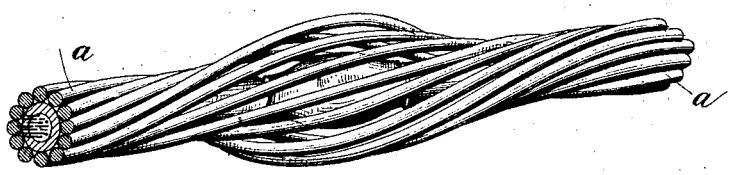

In the drawings, which is illustrative of my invention, Figure 1 is a sectional view of a submarine armored telegraph-cable provided with my improvement. Fig. 2 is an elevation thereof. Fig. 3 is a view showing the break in a cable at each side of the wipe joint of the lead pipe and the armor about the joint in the position which it assumes when my invention is not used.

By binding the armor about the joint with an extra armor of wire, and soldering this extra wire thereto, breaks like those illustrated in Fig. 3 are entirely prevented. The armor $a$ is wound upon the cable and over the wipe-joint of the lead pipe in the usual way. I then wind about the armor, over the wipe-joint, the extra armor $b$, so as to bind the armor $a$ closely about the wipe-joint. This extra wire or armor is secured in place by solder $c$, which may or may not completely cover the extra armor $b$. The cable is thus made rigid for a short distance each side of the wipe of the lead pipe. Cables thus doubly armored at the joints, though subjected to the action of the tides, do not break.

I claim—

The combination, with the wipe-joint of the lead pipe of a telegraph-cable, of the armor $a$, bound closely thereto by the wire $b$, said wire $b$ being held in place by the solder, substantially as and for the purpose specified.

In witness whereof I hereunto subscribe my name this 9th day of May, A. D. 1885.

WILLIAM R. PATTERSON.

Witnesses:
SAML. B. DOVER,
F. H. McCULLOCH.